United States Patent [19]

Bianchi et al.

[11] Patent Number: 5,445,028

[45] Date of Patent: Aug. 29, 1995

[54] DYNAMIC DIGITAL TRACKING FILTER

[75] Inventors: Robert G. Bianchi, Billerica, Mass.; David L. Garcia, Salem, N.H.

[73] Assignee: Ametek Aerospace Products Inc., Wilmington, Mass.

[21] Appl. No.: 387,014

[22] Filed: Feb. 10, 1995

Related U.S. Application Data

[63] Continuation of Ser. No. 946,913, Sep. 18, 1992, abandoned.

[51] Int. Cl.$^6$ .................... G01H 1/08; G01M 13/02; G01N 29/00
[52] U.S. Cl. ........................ 73/593; 73/660
[58] Field of Search ............. 73/579, 584, 583, 593, 73/648, 602, 649, 660; 340/682, 683, 679

[56] References Cited

U.S. PATENT DOCUMENTS

| | | | |
|---|---|---|---|
| 4,196,629 | 4/1980 | Philips | 73/593 |
| 4,377,947 | 3/1983 | Matsushita et al. | 73/593 |
| 5,263,372 | 11/1993 | Matsuzaki et al. | 73/593 |

*Primary Examiner*—Hezron E. Williams
*Assistant Examiner*—William L. Oen
*Attorney, Agent, or Firm*—Amster, Rothstein & Ebenstein

[57] ABSTRACT

A system for measuring the magnitude component corresponding to the once-per-revolution frequency or a multiple thereof of the vibration signal generated by a body rotating at a non-uniform rate. The output of a sensor detecting the acceleration of the vibration motion of the rotating body is decomposed into its frequency components. Simultaneously, the information contained in the output of a tachometer sensor for detecting the rotational speed of the rotating body is used to determine the variation of the rotational speed during the measurement interval. The speed variation information is selectively combined with the frequency components of the acceleration spectrum to yield the magnitude result that would be measured if the rotating body had a constant rotational speed. This method yields vibration information in select frequency bands that is corrected for the non-uniform rate of rotation of the body.

40 Claims, 2 Drawing Sheets

DYNAMIC DIGITAL TRACKING FILTER

This is a continuation of application Ser. No. 07/946,913 filed on Sep. 18, 1992, now abandoned.

BACKGROUND OF THE INVENTION

This invention relates to methods and apparatus for monitoring the vibration performance of rotating machines and, in particular, to methods and apparatus for determining vibration in variable speed rotating machines.

In order to better evaluate the performance of rotating machines or parts thereof, such as a shaft, it has been found desirable to represent their vibration characteristics in terms of magnitude and phase versus frequency, otherwise known as a power spectrum. In order to produce the power spectrum of vibration based data, uniform time interval data must be generally processed in a manner that converts the time based vibration data to frequency based data. This process is generally effective in the case where the rotational speed is constant; however, it is not generally applicable in its original form when the rotational speed is variable.

The classical approach used in the prior art to convert time-based vibration data from a fixed speed shaft to frequency-based data utilizes numerous hardware components. The hardware generally includes a sensor that monitors the rotational speed of the shaft, such as a tachometer; a generator that produces a fixed number of pulses for each revolution of the shaft; an acceleration, velocity or displacement sensor that generates the time-based vibration data; one or more analog filters that limit the aliasing errors associated with data sampling; and a sampling/analog-to-digital conversion circuit to convert the signal to digital form. In general, the time-based vibration data is sampled either synchronously or asynchronously with respect to the rotation of the shaft. In the prior art systems, the sampling done during a fixed shaft speed would provide signals useful in obtaining magnitude and phase measurements at the shaft once-per-revolution frequency. However, when the shaft speed is changing during the interval that the vibration signal is being sampled, the magnitude and phase measurements made with said sampled data are inaccurate.

The prior art utilizes, generally, three different methods to perform vibration measurements for variable speed shafts: analog tracking filters, switched capacitor tracking filters and digital tracking filters. The analog tracking filter multiplies the vibration signal by the once-per revolution (fundamental) shaft speed signal. Sum and difference frequencies result in accordance with well known principles. The difference frequency is extracted with a low pass filter. The output of the low-pass filter is then further processed to produce voltages proportional to vibration amplitude. These results are converted to digital form with a standard analog to digital converter. The aforementioned low-pass filter must have a wide bandwidth to minimize measurement inaccuracies due to the variability of the speed of the shaft. Therefore, the analog tracking filter method suffers from poor noise rejection due to the use of a wider than optimal pass-band which is required to maintain tracking during shaft speed changes.

The second method, the switched capacitor tracking filter, uses discrete time sampling techniques to synthesize stable high accuracy multi-pole filters. The cut-off frequencies of these filters are controlled with a clock. To implement the tracking aspect of the filter, the shaft speed is used to generate the switched capacitor filter clock which varies with shaft speed. The output of the filter is then further processed to extract the once-per-revolution vibration amplitude and phase angle. These results are converted to digital form with a standard analog to digital converter. Variations of this technique may use synthesized signals controlled by a computer based on measured tachometer speed. All of the switched capacitor tracking filter techniques suffer from time delays in responding to shaft speed variations, which results in mistracking when the shaft accelerates. Also, the tracking filter bandwidth is increased to tolerate shaft speed variations during the vibration measurement interval to compensate for poor dynamic performance in cut-off frequency modification. This approach results in non-optimal noise rejection due to the wider bandwidths required for dynamic tracking.

The third method, the digital tracking filter, uses digital processing techniques to implement the tracking filter through software. Digital processing techniques may be used to implement the equivalent analog filter approach or emulate the switched capacitor approach. Tracking can be implemented by re-calculating filter coefficients, heterodyning to DC by multiplying by a digital sinusoid, order tracking by sampling the vibration signal as an integer multiple of the once-per-revolution frequency, or order tracking by over-sampling and then selecting samples that correspond to an integer multiple of the once-per-revolution frequency. The digital tracking filter method suffers because, in order to insure tracking, the tracking filter bandwidths must be wide enough to contain the full range of speed variations encountered during sampling of the vibration data within its band. These wider bandwidths include, by necessity, energy outside of the fundamental shaft speed, and therefore increase the vibration measurement error by considering energy components of unwanted vibrations. Furthermore, the delay between measuring the rotation speed and estimating the frequency spectrum introduces mistracking errors similarly present in the two other processing techniques.

It is therefore an object of the invention to provide an improved digital tracking filter which overcomes problems found in prior digital tracking filters.

It is another object of the present invention to allow for accurate measurement of vibration amplitude of a rotating structure having non-uniform rotating speed.

A still further object of the present invention is to produce the most optimum vibration magnitude measurements for a given number of rotations of the structure, or a given time window.

A still further object of the present invention is to produce optimum vibration magnitude measurements for a given rotational speed variation.

A still further object of the present invention is to dynamically provide the minimum tracking bandwidth for the actual speed variation.

SUMMARY OF THE INVENTION

In the present invention, an improved digital tracking filter is used to more accurately measure the vibration frequency spectrum of a non-uniformly rotating body. In accordance with the invention, a digital signal representing the acceleration, velocity, or displacement of the vibration of a rotating body during a measurement period is stored in a memory. This vibration signal is then decomposed into its respective frequency components. Using tachometer data acquired during the same measurement period, selected decomposed frequency components are combined to produce a measurement representative of the vibration level associated with the revolution frequency of the rotating body.

In one specific example of the invention, the output of an accelerometer sensor which senses the vibration motion of the rotating body is amplified, integrated to velocity, filtered, then converted to digital form. When the accelerometer signal is converted to digital form, it is done in a group of contiguous samples called a data record. Each data record spans a specific time period; time gaps are permitted between data records. Concurrently during the formation of a vibration data record, the rate of rotation of the rotating body as measured by a tachometer sensor is converted to digital form. The resulting speed record is associated with the corresponding vibration data record formed during the same time period. The vibration data record is decomposed into its frequency components and stored in memory. By observing the associated speed record, the invention is able to identify the range of speed variation during the measurement interval. Based on the measured speed variation, the frequency components of the vibration signal are selectively summed to produce a corrected vibration magnitude measurement. This process produces a tracking filter with dynamically adjusted bandwidth. The adjusted bandwidth optimally rejects unwanted signals during each measurement interval and provides accurate vibration measurements. The selective frequency summing can also be performed on frequency components associated with multiples of the speed measurement.

BRIEF DESCRIPTION OF THE DRAWINGS

The invention can best be understood by reference to the following portion of the specification, taken in conjunction with the accompanying drawings, in which.

DESCRIPTION OF THE PREFERRED EMBODIMENT

The dynamic digital tracking filter (DDTF) of this invention is a hardware/software processing approach that provides optimal narrowband vibration tracking of a rotating body's fundamental vibration frequency as the speed of rotation of the body changes with time, i.e. is non-uniform. The typical process flow and filter arrangement are illustrated in FIGS. 1 and 2 which show the method and system for the processing required to calculate the tracked vibration based on a vibration input and speed input.

Figure 1:
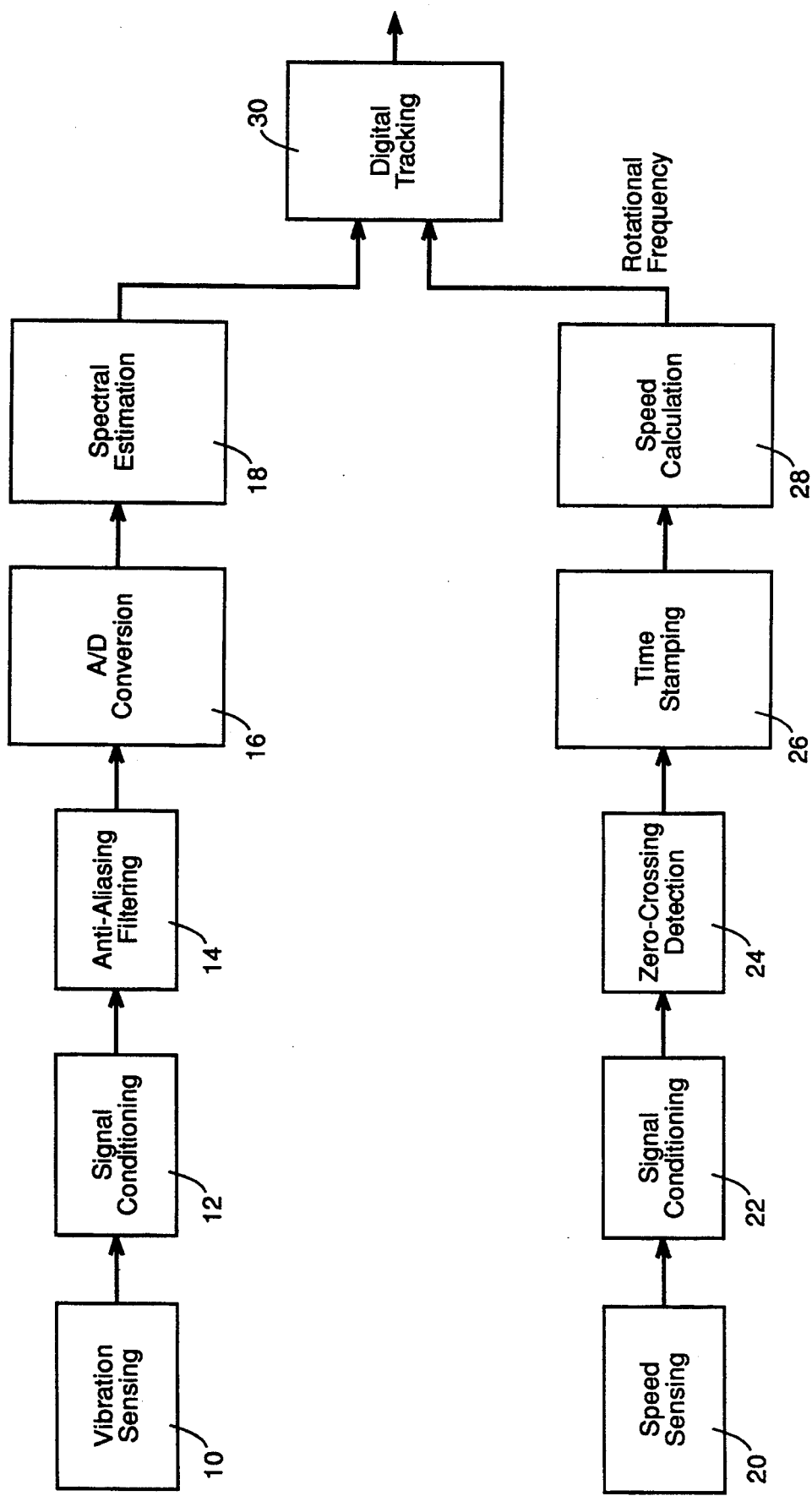
FIG. 1 is a schematic of the general processing flow for the dynamic digital tracking filter.
Figure 2:
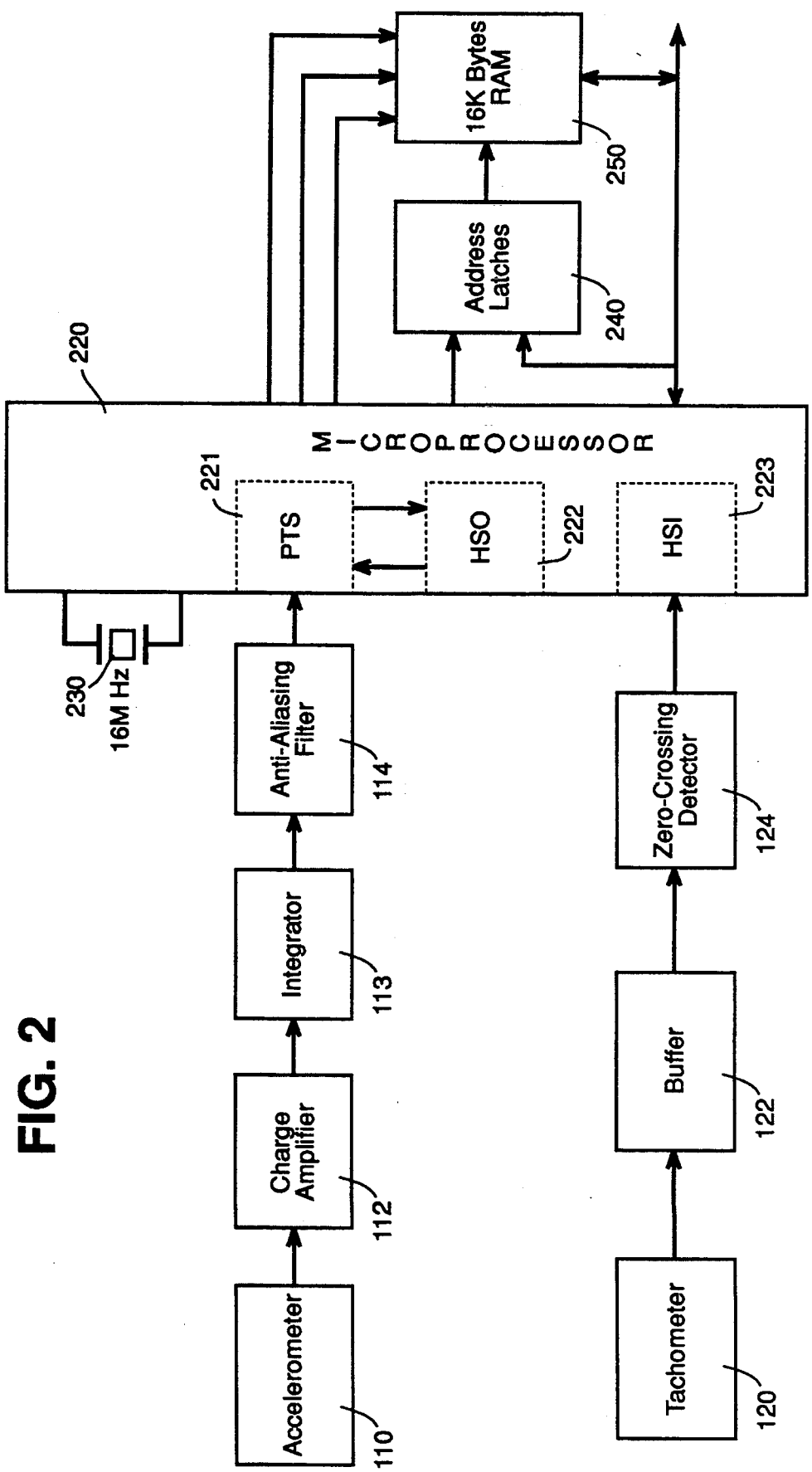
FIG. 2 is a block diagram of a specific embodiment of the present invention.

Referring now to FIG. 1, a vibration sensor, 10, senses the vibration and provides a vibration signal for conditioning at block 12. The vibration signal may be, as discussed further herein, an acceleration, velocity or displacement measurement. The conditioning of the signal at block 12, whether the signal is indicative of acceleration from an accelerometer, velocity from a velometer or displacement from a displacement sensor, is well-known in the art. The conditioned signal is next low-pass filtered at anti-aliasing filtering block 14 which removes unwanted high frequencies and produces a voltage proportional to the amplitude of vibration. The next step, at block 16, is the analog-to-digital conversion of the voltage to digital data which can readily be decomposed, at spectral estimation block 18, into its frequency components, by a well-known Fast Fourier Transform (FFT) process.

Simultaneous to the processing, along blocks 10, 12, 14, 16 and 18, of the vibration sensing data, speed data is being processed. Upon sensing of the speed data at block 20, and conditioning of the speed signal at block 22, the speed signal is processed by a zero-crossing detector, to output a digital signal with well defined transitions for time stamping at block 26. The speed of the time stamped signal can then readily be ascertained at speed calculation block 28. As will be recognized by one skilled in the art, the process functions which are set forth may be conducted by fewer parts than the function blocks would appear to recite, given the sophistication of the equipment involved. The necessary processing steps are set forth for implementation by one skilled in the art, taking care not to eliminate any steps which the skilled person would need to perform but might otherwise consider inherent in signal processing. Signal processing modifications of such a nature are meant to fall within the teachings set forth herein.

Once the speed calculating, from block 28, and the spectral estimation, from block 18, have been performed, the speed data is used to define those frequency components which are to be summed. The digital tracking block 30 represents the dynamic frequency summation step of which the output is the vibration amplitude information at the rotational frequency. For the monitoring of separately rotating components of a body, a tachometer reading for each component would be provided for use with the vibration sensor readings.

FIG. 2 provides a block diagram of the system including representative components for performing the various processing steps discussed above. A representative vibration sensor, accelerometer 110, is illustrated in FIG. 2. As noted above, a velometer may also be used to sense the velocity, or a displacement sensor can be utilized to directly sense displacement of the rotating body. The choice of sensor is primarily a choice driven by availability of components, accuracy of preferred components and further signal processing capabilities. One can sense acceleration and directly process the acceleration data. As an alternative, acceleration data can be sensed and subsequently converted to velocity data by an integration step; or, can be further converted to displacement data by a second integration. Similarly, sensed velocity data can be integrated into displacement data if such is required for further processing. For purposes of the present embodiment, an accelerometer, 110, will sense acceleration vibration data which will subsequently be integrated into velocity data for further processing as described with reference to FIG. 2. For this example, the processor, filter cut-off frequency, and sample rate are chosen to be capable of tracking the vibration of rotating machines from approximately 0 Hz to 300 Hz with 1 Hz resolution. Higher frequency ranges may be supported by changing the sampling rate, the processor computing power and the cut-off frequency.

A sensed acceleration signal output from accelerometer 110 is provided to charge amplifier 112, integrator 113, and anti-aliasing filter 114 thereby removing unwanted high frequencies and producing a voltage proportional to the velocity of vibration. At a sampling rate of 1024 Hz, aliasing is encountered at frequencies above 512 Hz. Assuming the frequency of interest is 300 Hz, the cut-off frequency of the filter, such as a Butterworth filter, is 333 Hz. The attenuation provided by a fifth order Butterworth anti-aliasing filter 114, as is well known in the art, is Attenuation = Poles* 20 log $F/f_c$ in dB Attenuation = 5* 20 log 724/333 = 33.7 dB The Butterworth anti-aliasing filter 114 is selected for maximum flatness. In addition to this filter type, there are a number of other standard methods to accomplish anti-aliasing filtering, as will be apparent to one skilled in the art. For example, the anti-aliasing filter 114 can be implemented, once again for the sake of example, with readily available switched capacitor filter integrated circuits. Charge amplifier 112 is implemented with a low-leakage, low-offset operational amplifier configured as a charge amplifier. These circuits and equivalent substitutions therefore are well-known in the art.

The tachometer, 120, senses the speed of the rotating body and provides the signal to tachometer processing components, 122 and 124, which convert the tachometer analog signal received from the tachometer 120 to a digital logic signal. In this example, a comparator configured as a differential zero-crossing detector 124 provides the digitized signal. In the microprocessor 220, high speed edge detector 223 uses the signal from zero crossing detector 124 to calculate the variable rotating period of the body, as reported by tachometer 120. The zero-crossing detector may be part of a more generic microprocessor processing unit that may contain additional circuits to accommodate signals specific to tachometer 120.

Shaft speed calculation is performed in the microprocessor 220 and applied to the spectral estimation data. As discussed with reference to FIG. 1, the vibration data is decomposed via a well-known Fast Fourier Transform (FFT) into its equivalent frequency components. After completion of the FFT, various frequency components are selected, based upon the tachometer data, and are summed. After this summing process, the summed data is output representing vibration amplitude information corrected for speed variations.

The high level schematic of a sample implementation of the dynamic digital tracking filter provided in FIG. 2 is based on Intel's 87C196KC single chip microcomputer. This microprocessor conveniently integrates all the resources to simultaneously sample and process the uncorrected, raw vibration and tachometer signals as required by the dynamic digital tracking filter. Those resources or components of the microprocessor are schematically illustrated for discussion purposes only, and are not representative of the actual arrangement therein.

The 87C196KC Microcomputer 220 in FIG. 2 provides an integrated 8-channel analog to digital (A/D) converter capable of sampling the velocity signal at 1.024 KHz. Clock 230 supplies the 16 MHz signal required by the operation of microprocessor 220 while address latches 240 and external memory 250 supply the memory space necessary to perform the data acquisition and computing functions, conducted by microprocessor 220. Tachometer 120 and accelerometer 110 work in conjunction with tachometer processing circuitry, 122 and 124, and accelerometer processing circuit, 112–114, to generate the input signals to microprocessor 220, as discussed above.

The 87C196KC hardware is configured to continuously sample the velocity signal through an integrated peripheral transaction server (PTS), conceptually illustrated at 221. The PTS acts like a direct memory access device in that samples are acquired and stored in memory with little processor overhead. When, as in the present example, 1024 data points have been accumulated (i.e., vibration sampled data set), an interrupt is generated and the data is appropriately windowed and a Fast Fourier Transform is performed.

The sample rate of the A/D converter is controlled by a series of configuration specifications, or entries, in the 87C196KC High Speed Output (HSO) hardware, at 222 for purposes of illustration. These entries configure the 87C196KC Timer 2 as a divide-by-1953 counter and start a conversion of the velocity channel (i.e., channel 0), when timer 2 is set to zero. Locking these entries into the 87C196KC memory, causes the microcomputer to perform a 1.024 KHz continuous sampling of the velocity input channel with relatively little processor overhead.

The 1/REV tachometer input from tachometer processing circuitry is converted to digital form continuously through the 87C196KC High Speed Input (HSI) Interface, illustrated at 223. The HSI Interface is a programmable edge detector that timestamps (records Timer 1 value where the 1/REV input transitions from a logic 0 to a logic 1) for each 1/REV zero-crossing. An interrupt is generated every time Timer 1 overflows (i.e., every 32.768 msec for an 87C196KC running at 16 MHz) so that time periods slower than the Timer 1 period may be measured. The overflow interrupt, in conjunction with the Timer 1 zero-crossing time stamp values, is used by the 1/REV calculation algorithm to measure the 1/REV Tach input period. The 1/REV Tach time period is 1/REV Period = Absolute Value [Last_Timer_1 – Current Timer_1] * 0.5 usec + 32.768 msec* [Number_of_Interrupts].

Where:
  Last_Timer_1 and Current_Timer_1 are the Timer_1 counts associated with the two most recent 1/REV Tach zero-crossings (Timer_1 has a time resolution to 0.5 usec); and the Number_of_Interrupts counter corresponds to the Timer_1 wraparound occurrences accumulated beyond one.

The 87C196KC processor implements the 1/REV calculation algorithm to calculate the 1/REV Period whenever a zero-crossing is detected (i.e., when a zero-crossing interrupt is generated). In addition, concurrent with vibration sampled data set acquisition, the 1/REV calculation algorithm keeps track of the lowest and highest 1/REV frequencies. When a complete vibration sampled data set has been acquired, the frequency range measured during sampling is used by the tracking filter algorithm to determine the tracked vibration amplitude. It may be advantageous to use a 2/REV or other multiple, other than 1, of the tachometer reading, given the component being monitored. If so, the frequencies of interest will be similarly adjusted as further described below.

A 1024 Point Fast Fourier Transform (FFT) is used by microprocessor 220 to calculate the frequency components of the velocity input. The vibration sampled data set input from accelerometer processing circuitry 110, 112–114, is windowed with a Hann Window and then processed with the FFT. Windowing the data with a Hann Window provides a reasonable compromise between resolution and unwanted signal attenuation. Selecting a window function is determined by the requirements of a specific application. Where maximum resolution is required, a rectangular window may be used. As an alternative, if maximum unwanted signal attenuation is required, then a Kaiser Window can be used. The window function chosen is dictated by the requirements of each specific application. Any window may be used by the digital dynamic tracking filter. Algorithms to implement window functions and the FFT are well known in the art. The FFT calculation provides an output spectrum with the amplitude of each of 1024 frequency components in 1024 unique bins. For the 87C196KC example sampling 1024 Points at 1.024 KHz, the bin that contains the amplitude measure of a specific frequency is determined as follows:

Bin = Integer [Frequency]

where the integer function rounds the frequency in hertz to the nearest whole number, thus producing the bin number corresponding to the frequency.

The tracked filter algorithm, also executed by the microprocessor, calculates the tracked vibration amplitude from the inputs provided by the spectral estimation algorithm and the 1/REV tachometer calculation algorithm. The tracked vibration algorithm combines (sums) the corresponding frequency bins that contain the vibration data based on the range of frequencies measured for the 1/REV tach. For example, if the tachometer frequency 1/REV has ranged from 10 Hz to 15 Hz, then FFT bins 10 through 15 will be summed to determine the tracked vibration amplitude. Similarly, if it is preferable to calculate based upon a 2/REV reading, where bins 10 to 15 would be summed for a 1/REV measurement, bins 20 to 30 would be summed. If the measured tachometer frequency 1/REV is 60.0 Hz to 60.2 Hz, then only bin 60 corresponding to a frequency of 60 Hz is used to calculate the tracked vibration amplitude.

The output of the FFT is a vector in the complex plane expressed in rectangular coordinates. The selected FFT bins are summed by computing the magnitude squared (real coordinate squared plus imaginary coordinates squared) of each bin, adding all bin squared magnitudes together, and taking the square root. For example, if bins 9 through 15 are selected then:

$$\text{Tracked Output} = \text{Square Root} \left[ \sum_{i=9}^{15} (a_i^2 + b_i^2) \right]$$

where each bin has value $a_i + jb$ and $j = \sqrt{-1}$.

The external memory 250 provides storage for the FFT input and output data. A total of 16K bytes is provided. The external memory interface is comprised of address latches 240 and related byte wide memory chips. The 87C196KC is linked thereto by a multiplexed address/data bus. The address latches use a signal from the processor to latch the address. This address is used to select the memory location. Since the memory devices in this example are the only devices on the bus, they are controlled directly by the 87C196KC read/write control signals.

The DDTF tracked vibration output can be transmitted via any common digital communication protocol and displayed in any common human readable form such as LED, LCD, cathode ray tube, or printer thereby facilitating the visual interpretation of the results as part of an overall system geared towards the analysis of vibration of a body having non-uniform rotational characteristics.

Although the present invention has been shown and described with respect to preferred embodiments, various changes and modifications which are obvious to persons skilled in the art of which the invention pertains are deemed to lie within the spirit and scope of the invention. For example, the processor, the sampling rate, the choice of frequencies and size of FFT or similar frequency decomposition algorithm can be modified without impacting the final result. Thus, numerous changes and modifications can be made while staying within the scope of the invention which is set forth in the appended claims.

I claim:

1. A tracking filter system for measuring the amplitude of the vibration of a rotating body during a measurement period when the rotational rate is uniform or non-uniform comprising:

a first sensor for sensing the vibration motion of said rotating body and for producing vibration digital data representative of vibration motion of said rotating body during said measurement period;

a second sensor for producing rotational speed digital data by measuring the time between rotations during said measurement period, simultaneous with said sensing of said vibration motion;

means for identifying a range of frequencies from said speed digital data comprising means for deriving the range of 1/REV frequencies for said speed digital data from the lowest time between rotations to the highest time between rotations during said measurement period;

means for decomposing said vibration digital data into two or more vibration frequency components; and means for summing two or more of said vibration frequency components corresponding to a multiple of the range of 1/REV speed frequencies from said speed digital data to produce a measure of the amplitude of vibration at the rotational frequency of said body.

2. The system of claim 1 further comprising display means for displaying said amplitude of vibration of said body in human readable form.

3. The system of claim 1, further comprising a digital memory for storing said digital data.

4. The system of claim 1 wherein said first sensor comprises an accelerometer for producing acceleration data and means for converting said acceleration data into digital data.

5. The system of claim 4 further comprising an integrator associated with said first sensor for producing velocity digital data.

6. The system of claim 4 further comprising a double integrator associated with said first sensor for producing displacement digital data.

7. The system of claim 1 wherein said first sensor comprises a velometer for producing velocity data and means for converting said velocity data into digital data.

8. The system of claim 7 further comprising an integrator associated with said first sensor for producing displacement digital data.

9. The system of claim 1 wherein said first sensor comprises a displacement sensor for producing displacement data and means for converting said displacement data into digital data.

10. A system for providing a tracking filter for sensing vibration components of motion of a rotating body, said filter having the minimum bandwidth necessary, comprising:
a first sensor for sensing the vibration motion of said rotating body and for producing vibration data of said rotating body for a measurement period;
a second sensor for producing rotational speed data by measuring the time between rotations during the measurement period, simultaneous with said sensing of the vibration motion of said rotating body;
means for decomposing said vibration data into two or more vibration frequency components;
means for identifying a bandwidth of frequencies from said rotational speed data by deriving the range of low to high 1/REV frequencies between rotations from said sensed speed digital data and defining the bandwidth as a multiple of the range of low to high 1/REV frequencies; and
means for summing two or more vibration frequency components corresponding to said identified bandwidth.

11. The system of claim 10 further comprising a first means for converting vibration data into digital data and a second means for converting said rotational speed data into digital data.

12. The system of claim 10 wherein said first sensor comprises an accelerometer for producing acceleration data.

13. The system of claim 12 further comprising a first means or converting acceleration data into digital data and a second means for converting said rotational speed data into digital data.

14. The system of claim 13 further comprising an integrator associated with said accelerometer for producing velocity data.

15. The system of claim 13 further comprising a double integrator associated with said accelerometer for producing displacement data.

16. The system of claim 10 wherein said first sensor comprises a velometer for producing velocity data.

17. The system of claim 16 further comprising a first means for converting acceleration data into digital data and a second means for converting said rotational speed data into digital data.

18. The system of claim 17 further comprising an integrator associated with said velometer for producing displacement data.

19. The system of claim 10 wherein said first sensor comprises a displacement sensor.

20. A method for dynamically defining the bandwidth of a tracking filter for use in characterizing the motion of a rotating body comprising:
sensing the rotational speed of the rotating body by measuring the time between rotations of said rotating body during a measurement period; and
defining the bandwidth of the filter as a multiple of the range of lowest time between rotations to the highest time between rotations of said sensed rotational speed.

21. A method for characterizing the vibration performance of a rotating body comprising the steps of:
monitoring vibration signals during a measurement period;
measuring rotational speed of said rotating body by measuring the time between rotations during the measurement period, simultaneous with said monitoring of said vibration signals;
transforming vibration signals from time data to frequency data;
selectively combining said frequency data by defining a 1/REV frequency bandwidth for the measurement period as the range from the lowest time between rotations to the highest time between rotations from said sensed rotational speed; and
combining two or more transformed vibration frequency data components corresponding to a frequency bandwidth of n/REV, where n is >1.

22. The method of claim 21 wherein said monitoring of vibration signals comprises sensing acceleration data with an accelerometer and converting said acceleration data into digital acceleration data.

23. The method of claim 22 further comprising integrating said digital acceleration data to produce digital velocity data.

24. The method of claim 23 further comprising further integrating said digital velocity data to produce digital displacement data.

25. The method of claim 21 wherein said monitoring of vibration signals comprises sensing velocity data with an velometer and converting said velocity data into digital velocity data.

26. The method of claim 25 further comprising integrating said digital velocity data to produce displacement data.

27. The method of claim 21 wherein said monitoring of vibration signals comprises sensing displacement with a displacement sensor.

28. A method for tracking multiple independent rotor speeds of a rotating body with a single vibration sensor comprising the steps of:
sensing vibration information of said rotating body for a measurement period;
simultaneously sensing the rate of rotation of said rotating body by measuring the time between rotations for said same measurement period;
transforming said vibration data into two or more vibration frequency components;
defining the range of 1/REV rate of rotation frequencies from said sensed rate of rotation as the range from said lowest time between rotations to said highest time between rotations; and
combining two or more of said vibration frequency components transformed from said vibration data corresponding to a multiple of said range of 1/REV rate of rotation frequencies from said sensed rate of rotation of said body.

29. The method of claim 28 further comprising the step of converting said vibration information into digital data.

30. The method of claim 28 further comprising the step of converting said rotation speed into digital data.

31. The method of claim 28 wherein said sensing of vibration data comprises sensing acceleration with an accelerometer.

32. The method of claim 31 further comprising the step of converting said sensed acceleration into digital acceleration data.

33. The method of claim 32 further comprising integrating said digital acceleration data to obtain digital velocity data.

34. The method of claim 33 further comprising integrating said digital velocity data to obtain digital displacement data.

35. The method of claim 28 wherein said sensing of vibration data comprises sensing velocity with a velometer.

36. The method of claim 35 further comprising the step of converting said sensed velocity information into digital velocity data.

37. The method of claim 36 further comprising the step of integrating said digital velocity data to obtain digital displacement data.

38. The method of claim 28 wherein said sensing of vibration data comprises sensing displacement with a displacement sensor.

39. The method of claim 28 wherein said combining comprises:
   defining a frequency bandwidth for the vibration measurement period; and
   summing two or more frequency data components falling within said frequency bandwidth.

40. A method for tracking multiple independent rotor speeds of a body having a plurality of rotating components with a single vibration sensor comprising the steps of:
   sensing the vibration motion of said body for a measurement period;
   simultaneously sensing the rate of rotation of each of said rotating components by measuring the time between rotations for said measurement period;
   transforming said vibration data into two or more vibration frequency components;
   identifying the range of 1/REV frequencies for said rate of rotation by identifying the range of lowest time between rotations to highest time between rotations encountered during said measurement period; and
   combining two or more of said vibration frequency components of said transformed vibration data corresponding to an integer multiple of said range of 1/REV frequencies for said rate of rotation.

* * * * *